(12) United States Patent
Torrey et al.

(10) Patent No.: US 11,261,847 B2
(45) Date of Patent: Mar. 1, 2022

(54) WIND TURBINE HAVING SUPERCONDUCTING GENERATOR AND METHOD OF OPERATING THE SAME

(71) Applicant: General Electric Company, Schenectady, NY (US)

(72) Inventors: David Allan Torrey, Ballston Spa, NY (US); Mark Ernest Vermilyea, Niskayuna, NY (US); Siddharth Navinchandra Ashar, Niskayuna, NY (US); Alexander Kagan, Guilderland, NY (US); Joseph John Zierer, Niskayuna, NY (US); Ernst Wolfgang Stautner, Niskayuna, NY (US); Paul St. Mark Shadforth Thompson, Stephentown, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/254,386

(22) PCT Filed: Jun. 27, 2018

(86) PCT No.: PCT/US2018/039701
§ 371 (c)(1),
(2) Date: Dec. 21, 2020

(87) PCT Pub. No.: WO2020/005222
PCT Pub. Date: Jan. 2, 2020

(65) Prior Publication Data
US 2021/0270239 A1    Sep. 2, 2021

(51) Int. Cl.
*F03D 9/25* (2016.01)
*F03D 80/80* (2016.01)
*H02K 55/04* (2006.01)

(52) U.S. Cl.
CPC .............. *F03D 9/25* (2016.05); *F03D 80/82* (2016.05); *H02K 55/04* (2013.01); *F05B 2260/231* (2013.01)

(58) Field of Classification Search
CPC ............ F03D 9/25; F03D 80/82; H02K 55/04
(Continued)

(56) References Cited

U.S. PATENT DOCUMENTS

| 2007/0040385 A1* | 2/2007 | Uchiyama ................ F03D 9/25 290/44 |
| 2009/0224550 A1 | 9/2009 | Bray et al. |

(Continued)

FOREIGN PATENT DOCUMENTS

WO    WO 2016/029918 A1    3/2016

OTHER PUBLICATIONS

PCT Search Report, dated Mar. 20, 2019.

*Primary Examiner* — Charles Reid, Jr.
(74) *Attorney, Agent, or Firm* — Dority & Manning, P.A.

(57) ABSTRACT

A wind turbine is presented. The wind turbine includes a rotor having a plurality of blades. The wind turbine further includes a shaft coupled to the rotor. Moreover, the wind turbine includes a superconducting generator coupled to the rotor via the shaft. The superconducting generator includes an armature configured to be rotated via the shaft. The superconducting generator further includes a stationary field disposed concentric to and radially outward from the armature.

16 Claims, 4 Drawing Sheets

(58) Field of Classification Search
USPC .................................................. 290/44, 55
See application file for complete search history.

(56) References Cited

U.S. PATENT DOCUMENTS

| | | | |
|---|---|---|---|
| 2010/0253085 A1* | 10/2010 | Minowa | F03D 9/25 |
| | | | 290/55 |
| 2012/0049531 A1 | 3/2012 | Bray | |
| 2016/0276918 A1 | 9/2016 | Morrison | |
| 2018/0375407 A1* | 12/2018 | Sartorius | H02K 15/028 |

* cited by examiner

US 11,261,847 B2

WIND TURBINE HAVING SUPERCONDUCTING GENERATOR AND METHOD OF OPERATING THE SAME

TECHNICAL FIELD

Embodiments of the present specification generally relate to a wind turbine and in particular, to a wind turbine including a superconducting generator.

BACKGROUND

Conventional machines such as a conventional superconducting generator typically includes field windings and an armature. The armature includes traditional ferromagnetic core and armature windings disposed on the traditional ferromagnetic core. The armature windings are generally formed using conventional materials, for example, copper or aluminum. Whereas, the field windings include superconducting wires that support very high current densities without incurring any dissipation. The conventional superconducting generator, when operated, the superconducting wires generate very high magnetic field, for example, on the order of 7 Tesla or larger due to the high current densities in the field winding. Such increased or magnetic field caused due to the superconducting wires is generally above the saturation flux density of traditional ferromagnetic materials. Additionally, due to the currents in the armature windings, the armature is also heated. During operation, as the armature is heated and the field windings are cooled, the power density in the conventional superconducting generator reduces and the efficiency of such conventional superconducting generator is also compromised.

BRIEF DESCRIPTION

In accordance with one embodiment of the present invention, a wind turbine is presented. The wind turbine includes a rotor having a plurality of blades. The wind turbine further includes a shaft coupled to the rotor. Moreover, the wind turbine includes a superconducting generator coupled to the rotor via the shaft. The superconducting generator includes an armature configured to be rotated via the shaft. The superconducting generator further includes a stationary field disposed concentric to and radially outward from the armature.

In accordance with another embodiment of the present invention, a method is presented. The method includes operating a wind turbine having a superconducting generator including an armature having an armature winding and a stationary field having a superconducting field winding, the stationary field being disposed concentric to and radially outward from the armature, whereby a magnetic gap between the superconducting field winding and the armature winding is reduced during the operation of the superconducting generator.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

In an effort to provide a concise description of these embodiments, all features of an actual implementation may not be described in the specification. It should be appreciated that in the development of any such actual implementation, as in any engineering or design project, numerous implementation-specific decisions may be made to achieve the developer's specific goals such as compliance with system-related and business-related constraints.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical or magnetic connections or couplings, whether direct or indirect. The term "magnetic gap" as used herein refers to a mean radial distance between a superconducting field winding and an armature winding.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As will be described in detail hereinafter, various embodiments of a wind turbine are presented. The wind turbine includes a rotor having a plurality of blades. The wind turbine further includes a shaft coupled to the rotor. Moreover, the wind turbine includes a superconducting generator coupled to the rotor via the shaft. The superconducting generator includes an armature configured to be rotated via the shaft. The superconducting generator further includes a stationary field disposed concentric to and radially outward from the armature.

Figure 1:
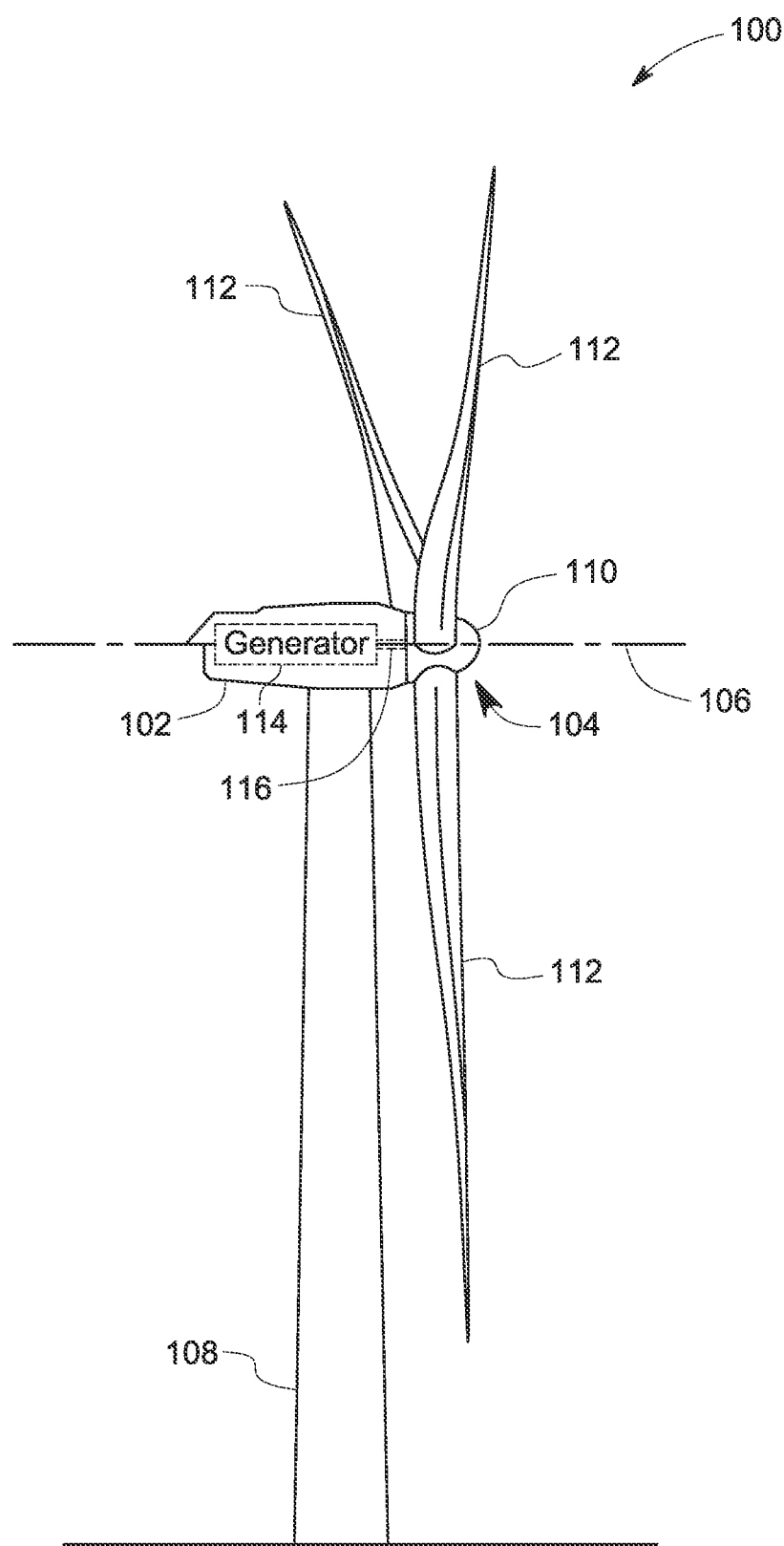
FIG. 1 is a schematic diagram of an example wind turbine, in accordance with one embodiment of the present specification.

Referring now to FIG. 1, a schematic diagram of an example wind turbine 100 is presented, in accordance with one embodiment of the present specification. The wind turbine 100 may be configured to generate electrical power using wind energy. The wind turbine 100 described and illustrated in the embodiment of FIG. 1 includes a horizontal-axis configuration. However, in some embodiments, the wind turbine 100 may include, in addition or alternative to the horizontal-axis configuration, a vertical-axis configuration (not shown). The wind turbine 100 may be coupled to, such as, but not limited to, a power grid, for receiving electrical power therefrom to drive operation of wind turbine 100 and/or its associated components and/or for supplying electrical power generated by the wind turbine 100 thereto. The wind turbine 100 may be coupled to an electrical load (not shown) to supply electrical power generated by the wind turbine 100 thereto to the electrical load.

The wind turbine 100 may include a body 102, sometimes referred to as a "nacelle," and a rotor 104 coupled to the body 102. The rotor 104 is configured to rotate with respect to the body 102 about an axis of rotation 106. In the embodiment of FIG. 1, the nacelle 102 is shown as mounted on a tower 108. However, in some other embodiments, the wind turbine 100 may include a nacelle that may be disposed adjacent to the ground and/or a surface of water.

The rotor 104 may include a hub 110 and a plurality of blades 112 (sometimes referred to as "airfoils") extending radially outwardly from the hub 110 for converting wind energy into rotational energy. Although the rotor 104 is described and illustrated herein having three blades 112, the rotor 104 may have any number of blades 112. The rotor 104 may have blades 112 of any shape, and may have blades 112 of any type and/or any configuration, whether such shape, type, and/or configuration is described and/or illustrated herein.

In some embodiments, the nacelle 102 may house, fully or partially, one or more of a superconducting generator 114, and a shaft 116. The superconducting generator 114 may be coupled to the rotor 104 via the shaft 116 and configured to be operated via the rotor 104. For example, rotations of the rotor 104 due to the wind energy in turn cause a rotary element (e.g., an armature) of the superconducting generator 114 to rotate via the shaft 116. In some embodiments, the shaft 116 may also include a gear box (not shown). In certain embodiments, use of the gear box may increase the operating speed of the superconducting generator 114 and reduce the torque requirement for a given power level. The presence or absence of the gearbox is immaterial to the embodiments of the superconducting generator 114 described in the present specification.

The superconducting generator 114 is configured to generate electrical power based at least on the rotations of the armature (shown in FIGS. 2 and 3) relative to the stationary field. In accordance with some embodiments described herein, the superconducting generator 114 may be configured to produce increased magnitudes of electrical current in comparison to traditional generators. The superconducting generator 114 may be implemented in the form of a synchronous generator. The superconducting generator 114 will be described in greater details in conjunction with FIGS. 2 and 3.

Figure 2:
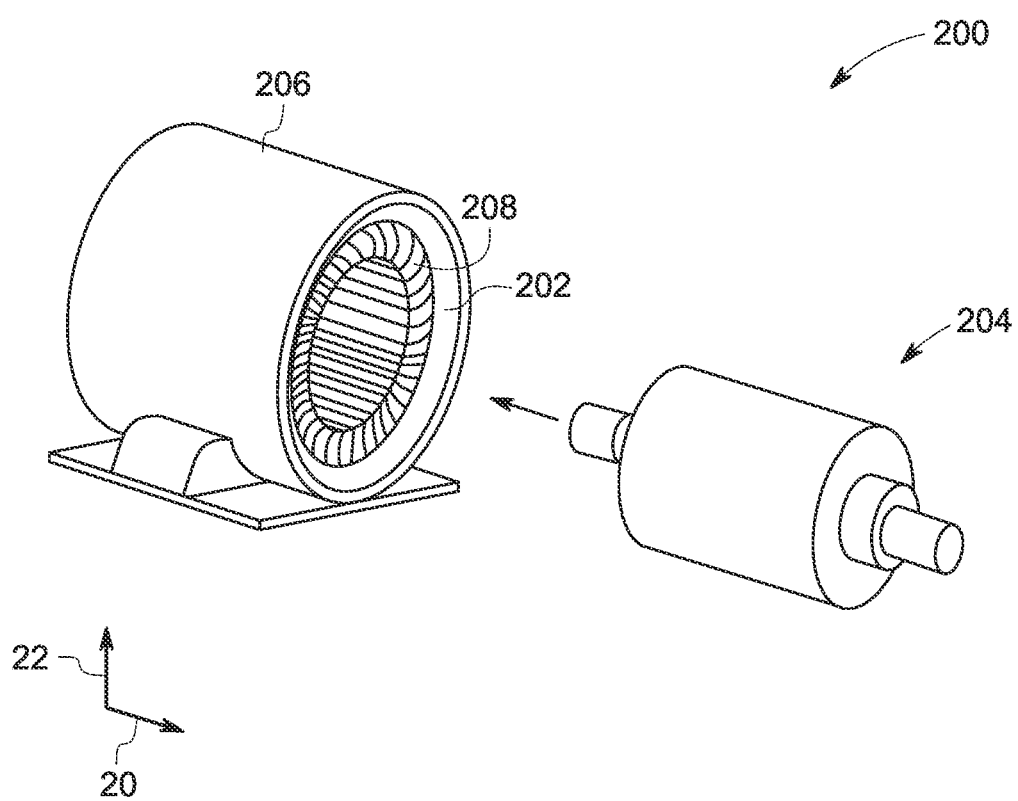
FIG. 2 is a schematic diagram of an electric machine, for example, a superconducting generator, in accordance with one embodiment of the present specification.

In FIG. 2, a schematic diagram of an electric machine, for example, a superconducting generator 200 is presented, in accordance with one embodiment of the present specification. The superconducting generator 200 may be representative of one embodiment of the superconducting generator 114 used in the wind turbine 100 of FIG. 1. Without limiting the scope of the present application, the superconducting generator 200 may be used in any application other than wind turbines. By way of a non-limiting example, the superconducting generator 200 depicted in FIG. 2 is a radial field electric machine. Moreover, although the superconducting generator 200 is shown as the electric machine of FIG. 2, in some other embodiments, the electric machine of FIG. 2 may also be a superconducting motor. Reference numerals 20 and 22 respectively represent an axial direction and a radial direction of the superconducting generator 200.

As depicted in FIG. 2, the superconducting generator 200 includes a stationary field 202 and an armature 204 disposed in a housing 206. By way of example, in some embodiments, when the superconducting generator 200 is deployed as the superconducting generator 114 in the wind turbine 100, the armature 204 may be coupled to the rotor 104 of the wind turbine 100 via the shaft 116 or via both the shaft 116 and the gear box. The armature 204 may be configured to be rotated via the shaft 116. Due to the rotations of the armature 204, the superconducting generator 200 may generate electrical power by virtue of the voltage induced in armature windings as they move past the magnetic field established by the superconducting field winding 208.

An exploded view of the superconducting generator 200 is depicted in FIG. 2 to separately show the stationary field 202 and an armature 204. The stationary field 202 includes superconducting field winding 208 (also identified by reference numeral 308 in FIG. 3) that is configured to generate a magnetic field oriented in the radial direction 22 of the superconducting generator 200. Moreover, the armature 204 may include an armature winding (identified by reference numeral 320 in FIG. 3). In some embodiments, the armature winding 320 is non-superconducting winding.

The stationary field 202 is disposed concentric to and radially outward from the armature 204. The stationary field 202 is maintained at a temperature, adequate for keeping the stationary field 202 superconducting, generally much lower than the temperature of the armature 204. Typically, to enable the superconducting property of the stationary field 202, the stationary field 202 is maintained within a cryogenic range of about 4 degrees Kelvin if the superconducting field winding 208, 308 is composed of low temperature superconducting material; if the superconducting field winding 208, 308 is composed of high temperature superconducting material, the stationary field 202 is maintained at a temperature of about 30 degrees Kelvin. By way of non-limiting example, the low temperature superconducting material may include an alloy of niobium and tin, or an alloy of niobium and titanium. By way of non-limiting example, the high temperature superconducting material may include yttrium barium copper oxide (YBCO).

As the stationary field 202 is brought from ambient to its cryogenic temperature for operation of the superconducting generator 200, the stationary field 202 may contract/shrink in size. Consequently, an inner radius of the stationary field 202 is reduced thereby bringing the stationary field 202 closer to the armature 204 resulting in a reduction in a magnetic gap between the superconducting field winding 208, 308 and the armature winding 320. The term "magnetic gap" as used herein refers to a mean radial distance between the superconducting field winding 208, 308 disposed in the stationary field 202 and the armature winding 320 disposed in the armature 204. By way of a non-limiting example, for a large offshore wind turbine application, the stationary field 202 of the superconducting generator 200 may be designed to have the inner radius in a range of about 3 meters to 5 meters. In another non-limiting example, the inner radius of the stationary field is about 4 meters. Further, when operating at the cryogenic temperatures, the stationary field 202 may shrink, for example, up-to about 1 percent, during operation of the wind turbine 100 resulting in a reduction in a magnetic gap between the superconducting field winding 208, 308 and the armature winding 320. At cryogenic temperatures, the stationary field 202 may shrink about 0.5 percent, resulting in a reduction of about 20 millimeters for the stationary field 202 having the inner radius of about 4 meters, for example.

The temperature of the armature 204 is at or above ambient temperature as the armature 204 includes the armature winding 320. Moreover, during the operation of the superconducting generator 200, the armature 204 may become heated due to the conduction losses associated with the currents flowing in the armature 204, resulting in an expansion of the armature 204. Consequently, the outer radius of the armature 204 increases. The armature 204 may also experience some expansion due to centrifugal loading as it rotates, adding to the expansion due to heating. Therefore, because of contraction of the stationary field 202 and/or expansion of the armature 204 and because the stationary field 202 is disposed concentric to and radially outward from the armature 204, the magnetic gap between the stationary field 202 and the armature 204 reduces. By way of non-limiting example, for an application of the superconducting generator 200 in an offshore wind turbine, the superconducting generator 200 may be designed with a magnetic gap between the stationary field 202 and the armature 204 of about 45 millimeters. In some embodiments, the magnetic gap between the stationary field 202 and the armature 204 may reduce up-to about 5 millimeters during the operation of the superconducting generator 200. The reduction in the magnetic gap between the stationary field 202 and the armature 204 leads to increase in a magnetic flux density (i.e., magnetic flux per unit area) in the superconducting generator 200. Advantageously, an efficiency of the superconducting generator 200 is also increased. Additional structural details of the stationary field 202 will be described in conjunction with FIG. 3.

Figure 3:
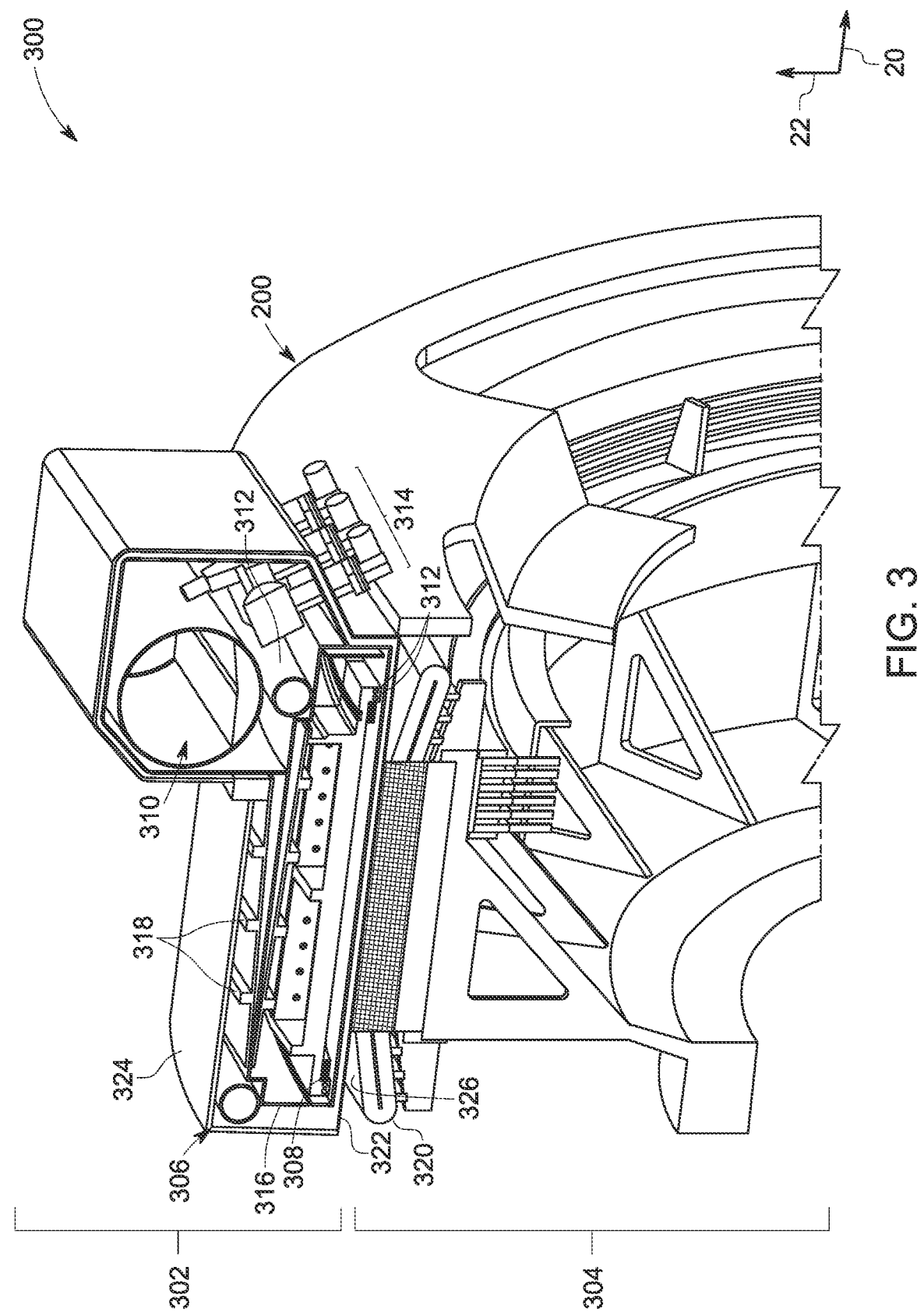
FIG. 3 is a perspective cross-sectional view of a portion of the electric machine (e.g., the superconducting generator) of FIG. 2, in accordance with one embodiment of the present specification.

Turning now to FIG. 3, a perspective cross-sectional view 300 of a portion of the superconducting generator 200 of FIG. 2 is presented, in accordance with one embodiment of the present specification. The superconducting generator 200 includes a stationary field 302 (similar to the stationary field 202 of FIG. 2) and an armature 304 (similar to the armature 204 of FIG. 2). The stationary field 302 is disposed concentric to and radially outward from the armature 304 and includes a vacuum vessel 306 and a superconducting field winding 308. In some embodiments, the superconducting generator 200 may also include one or more tanks 310, one or more conduits 312, a cooling apparatus 314, a thermal shield 316, one or more torque transfer structures 318 such as torque tubes, or combinations thereof. Moreover, the armature 304 includes an armature winding 320. In some embodiments, the armature winding 320 is non-superconducting winding. In the embodiment shown in FIG. 3, torque tubes are used as the torque transfer structures 318. Other types of torque transfer structures or torque transfer mechanisms may also be used in place of or in addition to the torque tubes, without limiting the scope of the present specification. In the description hereinafter, the terms "torque transfer structures" and "torque tubes" are interchangeably used.

As depicted in the perspective cross-sectional view 300 of FIG. 3, the vacuum vessel 306 (also referred to as a cryostat) is an annular vessel that houses, either fully or partially, one or more of the superconducting field winding 308, the tank 310, the one or more conduits 312, the cooling apparatus 314, the thermal shield 316, and the one or more torque tubes 318. The reference numerals 322 and 324 respectively represent an inner wall and an outer wall of the vacuum vessel 306. In some embodiments, the inner wall 322 faces the armature 304. More particularly, the stationary field 302 and the armature 304 are disposed such that the inner wall 322 of the vacuum vessel 306 is positioned radially opposite to an outer surface 326 of the armature 304.

In some embodiments, the inner wall 322 of the vacuum vessel 306 is thinner than the outer wall 324 of the vacuum vessel 306. Radially outward forces are applied on the inner wall 322 of the vacuum vessel which may load the inner wall 322 in tension. The forces on the outer wall 324 of the vacuum vessel are directed in a radially inward direction, thereby loading the outer wall 324 in compression. The compressive forces may cause buckling if the outer wall 324 is not sufficiently thick. Due to the difference in direction of the radial forces between the inner wall 322 and the outer wall 324, the outer wall 324 may be designed to be thicker than the inner wall 322.

Due to ambient pressure outside, and vacuum inside, vacuum vessel 306 is subjected to differential pressure loading. In some embodiments, the inner wall 322 of the vacuum vessel 306 is thinner than the outer wall 324 of the vacuum vessel 306. Radially outward forces are applied on the inner wall 322 of the vacuum vessel which loads the inner wall 322 in tension. The forces on the outer wall 324 of the vacuum vessel are directed in a radially inward direction, thereby loading the outer wall 324 in compression. The compressive forces may cause buckling if the outer wall 324 is not sufficiently thick. Due to the difference in direction of the radial forces between the inner wall 322 and the outer wall 324, the outer wall 324 is designed to be thicker than the inner wall 322.

Further, in some embodiments, the stationary field 302 may also include suitable arrangement for cooling and maintaining the superconducting field winding 308 at cryogenic temperatures. By way of example, such arrangement for cooling the superconducting field winding 308 may include one or more of the tanks 310, the conduits 312, and the cooling apparatus 314. The tank 310 is disposed in fluid communication with the cooling apparatus 314 and stores a cooling fluid. Although the stationary field 302 is shown as including a single tank 310, use of two or more such tanks for holding the cooling fluid is also envisioned within the scope of the present specification. Non-limiting examples of the cooling fluid may include any type of gaseous or condensed cooling fluids, for example, liquid helium.

Furthermore, the cooling apparatus 314 may be disposed inside or outside vacuum vessel 306 and configured to cool the cooling fluid so as to maintain the superconducting field winding 308 at a temperature that is below a cryogenic temperature. At the cryogenic temperature, the material of the field winding 308 is superconducting. The appropriate temperature range for operation of the superconducting field winding 308 depends on the superconducting material selected for the superconducting field winding 308. In particular, the cooling apparatus 314 may be configured to cool the cooling fluid so as to maintain the superconducting field winding 308 at the cryogenic temperatures, for example, at about 4 degrees Kelvin that may be appropriate for the low temperature superconducting material such as an alloy of niobium and titanium. In another non-limiting example, the cooling apparatus 314 may be configured to cool the cooling fluid so as to maintain the temperature of the superconducting field winding 308 in a range of about 3.6 degrees Kelvin to about 4.8 degrees Kelvin that may be appropriate for the low temperature superconducting material such as an alloy of niobium and tin. In yet another non-limiting example, the cooling apparatus 314 may be configured to cool the cooling fluid so as to maintain the temperature of the superconducting field winding 308 in a range of about 20 degrees Kelvin to about 26 degrees Kelvin that may be appropriate for a high temperature superconducting material such as yttrium barium copper oxide (YBCO). Moreover, in a non-limiting example, liquid helium may be used as the cooling fluid for low temperature superconductors because it has a temperature of about 5.19 degrees Kelvin. In another non-limiting example, for the high temperature superconducting materials, hydrogen or neon may be used as the cooling fluid.

The conduits 312 may be disposed inside the vacuum vessel 306 and fluidly coupled to the tank 310. The conduits 312 may be disposed annularly inside the vacuum vessel 306. The conduits 312 are configured to facilitate flow of the cooling fluid within the stationary field 302. In particular, the cooling fluid passively circulates annularly inside the stationary field 302 through the conduits 312, driven by density gradients and phase change. While being circulated, the cooling fluid removes any heat (such as from radiation or conduction heat transfer or from eddy current heating created by generator operation) deposited onto or into a low-temperature structure of the stationary field 302 and superconducting field winding 308, thereby maintaining the superconducting field winding 308 at cryogenic temperatures.

Moreover, in some embodiments, the thermal shield 316 may be disposed inside the vacuum vessel 306. In some embodiments, the thermal shield 316 may be disposed inside the vacuum vessel 306 such that the thermal shield 316 encloses the superconducting field winding 308 and aids in maintaining the temperature of the superconducting field winding 308 at the cryogenic temperatures.

Additionally, in some embodiments, the stationary field 302 may include one or more torque tubes 318 disposed inside the vacuum vessel 306. In some embodiments, the torque tubes 318 may be annularly disposed inside the vacuum vessel 306. By way of example, the torque tubes 318 may be disposed adjacent to one or more walls of the thermal shield 316. In particular, while some torque tubes 318 may be disposed inside the thermal shield 316, some other torque tubes 318 may be disposed outside the thermal shield. The torque tubes 318 are configured to support a reaction torque caused due to an interaction between a magnetic field produced by the armature 304 and a magnetic field produced by the superconducting field winding 308.

Figure 4:
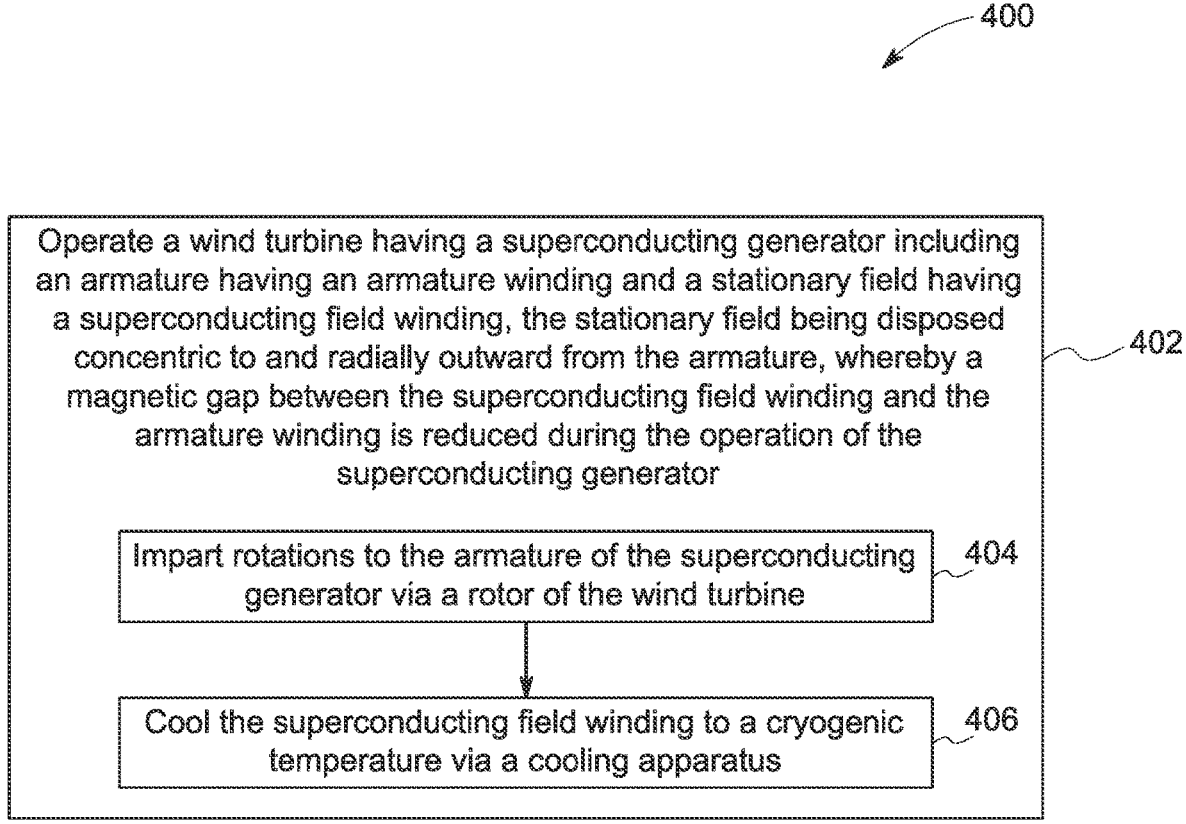
FIG. 4 is a flow diagram of a method for operating the wind turbine of FIG. 1, in accordance with one embodiment of the present specification.

Referring now to FIG. 4, a flow diagram 400 of a method for operating the wind turbine 100 of FIG. 1, in accordance with one embodiment of the present specification. FIG. 4 will be described in conjunction with FIGS. 1-3. The method of FIG. 4 includes, operating, at step 402, the wind turbine 100 having the superconducting generator 114, 200 including the armature 204, 304 having the armature winding 320 and the stationary field 202, 302 having the superconducting field winding 208, 308. As previously noted, the stationary field 202, 302 is disposed concentric to and radially outward from the armature 204, 304, whereby the magnetic gap between the superconducting field winding 208, 308 and the armature winding 320 is reduced during the operation of the wind turbine 100. In particular, the magnetic gap between the superconducting field winding 208, 308 and the armature winding 320 reduces due to a contraction of the stationary field, an expansion of the armature, or a combination thereof. For example, as described previously, when operating at the cryogenic temperatures, the stationary field 202, 302 may shrink/contract. Further, due to increased temperature of the armature 204, 304, the armature 204, 304 may also experience some expansion. Because of the contraction of the stationary field 202, 302 and/or expansion of the armature 204, 304, and because the stationary field 202, 302 is disposed concentric to and radially outward from the armature 204, 304, the magnetic gap between the stationary field 202 and the armature 204 reduces.

The step 402 of operating the wind turbine 100 includes imparting rotations to the armature 204, 304 of the superconducting generator 114, 200 via the rotor 104 of the wind turbine 100, as indicated by step 404. The rotor 104 of the wind turbine 100 is mechanically coupled to the armature 204, 304 of the superconducting generator 114, 200 so that rotations of the rotor 104 due to the wind energy results in rotations of the armature 204, 304 of the superconducting generator 114, 200.

Further, the step 402 of operating the wind turbine 100 includes cooling the superconducting field winding 208, 308 to a cryogenic temperature via the cooling apparatus 314, as indicated by step 406. The cooling fluid such as liquid helium, hydrogen, neon, or combinations thereof, may be cooled and circulated via the cooling apparatus 314 inside the stationary field 202, 302 through one or more conduits 312 so as to maintain the superconducting field winding 208, 308 at the cryogenic temperature so that the material of the field winding 308 is superconducting.

In accordance with the embodiments described herein, an improved wind turbine such as the wind turbine 100 and an improved superconducting generator such as the superconducting generator 114, 200 are provided. The improvements in the wind turbine 100 and the superconducting generator 114, 200 may be achieved, at least partially, due to an enhanced arrangement of the stationary field 202, 302 and the armature 204, 304, in accordance with some embodiments of the present specification. In particular, the stationary field 202, 302 is disposed concentric to and radially outward from the armature 204, 304. Advantageously, due to contraction of the stationary field 202, 302 and/or expansion of the armature 204, 304 and because the stationary field 202, 302 is disposed concentric to and radially outward from the armature 204, 304, the magnetic gap between the stationary field 202, 302 and the armature 204, 304 reduces during operation of the superconducting generator 114, 200. The reduction in the magnetic gap between the stationary field 202, 302 and the armature 204, 304 leads to an increase in the magnetic flux linking the armature 204, 304 of the superconducting generator 114, 200. Advantageously, an efficiency of the superconducting generator 114, 200 is also increased because less armature current is needed to produce a given power because of the increased armature 204, 304 flux linkage. Moreover, due to the vacuum vessel 306 with the thinner inner wall 322 in comparison to the outer wall 324 thereof, structural loads/forces acting inside and outside the superconducting generator 114, 200 may be compensated, thereby reducing vibrations of the superconducting generator 114, 200. Moreover, due to the improved arrangement of the stationary field 202, 302 and the armature 204, 304, design/manufacturing tolerances during an assembly of the superconducting generator 114, 200 may be relaxed.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

The invention claimed is:

1. A wind turbine, comprising:
   a rotor comprising a plurality of blades;
   a shaft coupled to the rotor; and
   a superconducting generator coupled to the rotor via the shaft, wherein the superconducting generator comprises:
   an armature comprising an armature winding and configured to be rotated via the shaft; and
   a stationary field comprising a superconducting field winding and disposed concentric to and radially outward from the armature; and
   a cooling apparatus configured to maintain the superconducting field winding at a cryogenic temperature relative to a temperature of the armature so as to reduce a magnetic gap between the superconducting filed winding and the armature winding during operation of the superconducting generator.

2. The wind turbine of claim 1, wherein the stationary field comprises a vacuum vessel comprising an inner wall and an outer wall, wherein the inner wall is thinner than the outer wall and faces the armature.

3. The wind turbine of claim 2, wherein the superconducting field winding disposed inside the vacuum vessel.

4. The wind turbine of claim 3, wherein the superconducting field winding is configured to generate a magnetic field oriented in a radial direction of the superconducting generator.

5. The wind turbine of claim 3, wherein the stationary field further comprises a thermal shield disposed inside the vacuum vessel and enclosing the superconducting field winding.

6. The wind turbine of claim 3, wherein the stationary field further comprises one or more torque transfer structures disposed inside the vacuum vessel to support a reaction torque caused due to an interaction between a magnetic field produced by the armature and a magnetic field produced by the superconducting field winding.

7. The wind turbine of claim 3, wherein the stationary field further comprises a cooling apparatus configured to maintain the superconducting field winding at a cryogenic temperature.

8. The wind turbine of claim 7, wherein the stationary field further comprises one or more tanks for storing a cooling fluid, wherein the one or more tanks are disposed inside the vacuum vessel and in fluid communication with the cooling apparatus.

9. The wind turbine of claim 8, wherein the stationary field further comprises one or more conduits fluidly coupled to the one or more tanks and disposed inside the vacuum vessel, wherein the one or more conduits are configured to facilitate flow of the cooling fluid within the stationary field.

10. The wind turbine of claim 3, wherein an inner radius of the stationary field is in a range of 3 meters to 5 meters.

11. The wind turbine of claim 3, wherein the stationary field is configured to shrink up to 1 percent during operation of the wind turbine resulting in a reduction in a magnetic gap between the superconducting field winding and the armature winding.

12. The wind turbine of claim 3, wherein the armature is configured to expand during operation of the wind turbine resulting in a reduction in a magnetic gap between the superconducting field winding and the armature winding.

13. The wind turbine of claim 3, wherein an inner radius of the stationary field is 4 meters and wherein the stationary field is configured to shrink and the armature is configured to expand such that the magnetic gap between the superconducting field winding and the armature winding reduces from 45 millimeters to 5 millimeters.

14. The wind turbine of claim 13, wherein the stationary field is configured to shrink such that an inner radius of the stationary field is reduced by 20 millimeters.

15. A method comprising:
    operating a wind turbine having a superconducting generator comprising an armature having an armature winding and a stationary field having a superconducting field winding, the stationary field being disposed concentric to and radially outward from the armature; and
    controlling a temperature of the superconducting field with a cooling apparatus configured with the superconducting field winding such that a relative temperature of the superconducting field and the armature causes reduction of a magnetic gap between the superconducting field winding and the armature winding during the operation of the superconducting generator.

16. The method of claim 15, wherein operating the wind turbine comprises imparting rotations to the armature of the superconducting generator via a rotor of the wind turbine wherein the magnetic gap reduces at least in part due to an expansion of the armature.

* * * * *